(12) United States Patent
Rütten et al.

(10) Patent No.: US 7,301,151 B2
(45) Date of Patent: Nov. 27, 2007

(54) DETECTOR FOR THE TEMPORALLY RESOLVED RECORDING OF DETECTION EVENTS

(75) Inventors: Walter Rütten, Linnich (DE); Michael Overdick, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 109 days.

(21) Appl. No.: 10/560,186

(22) PCT Filed: Jun. 7, 2004

(86) PCT No.: PCT/IB2004/050849

§ 371 (c)(1),
(2), (4) Date: Dec. 9, 2005

(87) PCT Pub. No.: WO2004/111682

PCT Pub. Date: Dec. 23, 2004

(65) Prior Publication Data

US 2007/0090297 A1    Apr. 26, 2007

(30) Foreign Application Priority Data

Jun. 16, 2003 (EP) .................................. 03101757

(51) Int. Cl.
*G01T 1/164* (2006.01)

(52) U.S. Cl. ................................................ 250/363.03
(58) Field of Classification Search ............ 250/363.03
See application file for complete search history.

(56) References Cited

U.S. PATENT DOCUMENTS

| 5,241,181 A | 8/1993 | Mertens et al. | ......... 250/363.03 |
|---|---|---|---|
| 5,272,343 A | 12/1993 | Stearns | .................. 250/363.03 |
| 5,272,344 A | 12/1993 | Williams | ............... 250/363.03 |
| 5,841,140 A | 11/1998 | Mc Croskey et al. | ... 250/363.03 |
| 6,255,655 B1 | 7/2001 | Mc Croskey et al. | ... 250/363.03 |
| 2001/0017352 A1 | 8/2001 | Stark | ..................... 250/363.03 |
| 2003/0141906 A1* | 7/2003 | Tumer et al. | ................. 327/69 |

* cited by examiner

*Primary Examiner*—David Porta
*Assistant Examiner*—Mindy Vu

(57) ABSTRACT

The invention relates to a detector for the temporally resolved recording of detection events, comprising a converter device (34, 35, 36), which in the operating state supplies an electrical signal when a detection event occurs, and evaluation electronics (1) having at least one trigger (3) which is coupled to the converter device (34, 35, 36) and is designed to supply a trigger signal (5) that is temporally assigned to the electrical signal, at least one time signal source (10) that supplies a first analog time signal ($Z1$), and at least a first sampler (6) which is coupled to the trigger (3) and is designed to provide a first momentary value ($E1$) of the first analog time signal ($Z1$), said first momentary value being temporally assigned to the trigger signal (5).

21 Claims, 7 Drawing Sheets

DETECTOR FOR THE TEMPORALLY RESOLVED RECORDING OF DETECTION EVENTS

BACKGROUND

The invention relates to a detector for the temporally resolved recording of detection events. The invention furthermore relates to an imaging device comprising such a detector. The invention also relates to a method for the temporally resolved recording of detection events.

Detectors for the temporally resolved recording of detection events are used when the time information is important for the evaluation of detector data or else when detection events which belong to one another in time terms are to be found. This is the case for example in Positron Emission Tomography (PET). Such PET devices are used to measure the annihilation quantum pairs which occur in matter in the case of positron emission. Positron emitters (e.g. fluoro compounds comprising the fluorine isotope with atomic number 18) are for instance injected into a patient and distribute in a specific manner in the body of the patient, depending on the type of chemical compound containing the positron emitter. In the case of positron emission, the positron will typically annihilate with an electron after a few tenths of a millimeter (mm) and two gamma quanta each of 511 kiloelectronvolts (keV) energy are irradiated in essentially opposite directions. The quanta are recorded by means of a detector arranged around the patient, said detector forming part of the PET device. Two detector events are assigned to a single annihilation process if they lie within a coincidence time window having a length of a few nanoseconds (ns). The distribution of the injected positron emitter in the body of the patient can be reconstructed by means of the measured coincident events.

The quality of the measurement, the associated reconstruction of the distribution of the positron emitter and the meaningfulness of the diagnosis that can be subsequently derived from the measured distribution can be improved if the point of annihilation can be determined (approximately). For this purpose, temporal resolutions of up to 0.1 ns or even shorter times are required. An example of such a method is "Time of Flight" PET (TOF PET).

US patent application US 2001/0017352 discloses a device for improving the image quality in positron emission tomography. This device comprises photomultipliers which are in each case connected to an amplifier which is followed by an analog/digital converter (ADC). By means of a central digital clock running at 2 ns cycles, so-called time stamps are added to the digital signal of a detection event following the ADC for the purpose of further evaluation.

In order to ensure the high temporal resolution, which allows a spatial assignment of detection events to an annihilation point, high frequency time information or trigger signals in the Gigahertz (GHz) range (about 1-10 GHz) must be transmitted over the entire detector to the individual detector channels or from the individual channels to a central time acquisition unit. In order to ensure highly accurate, precise and loss-less transmission of such frequencies within the detector arrangement, there is a need for high technical and financial outlay. By way of example, rapid digital memories are required. In addition, the high frequency signals from other components, for instance the amplifiers, may cause interference.

SUMMARY

It is therefore an object of the invention to provide a detector which allows highly temporally resolved detection and avoids the problems described above.

This object is achieved by a detector for the temporally resolved recording of detection events, comprising a converter device, which in the operating state supplies an electrical signal when a detection event occurs, and evaluation electronics having at least one trigger that is coupled to the converter device and is designed to supply a trigger signal that is temporally assigned to the electrical signal, at least one time signal source that supplies a first analog time signal, and at least a first sampler that is coupled to the trigger and is designed to provide a first momentary value of the first analog time signal, said first momentary value being temporally assigned to the trigger signal.

Such a detector offers the advantage that no extremely high frequency time signals, such as a very rapidly counting digital clock, have to be transmitted. In the detector according to the invention use is made of an analog time signal, the frequency distribution of which can be controlled. Instead of a digital clock signal, in this case an analog signal is transmitted, for example a ramp signal or a sinusoidal signal. A time value can then be calculated from the sampled analog momentary value. High frequencies occur only locally during rapid triggering of the samplers (sample & hold stages). The detector arrangement thereby avoids the occurrence of very high frequency components which could affect other parts.

Advantageously, the time signal is periodic, with sinusoidal or cosinusoidal time signals such as $Z1 = A \sin(\omega_1 t)$ being particularly suitable since they do not contain any signal components having a higher frequency than $f_1 = \omega_1 / 2\pi$. Other analog signal types are also conceivable, such as sawtooth signals or triangular signals, since although these do contain high frequency fractions the latter can be suppressed by a long period.

In another embodiment of the invention there is a clock which measures the time in units of a uniqueness interval of the first analog signal. This uniqueness interval is the time interval in which the sampled momentary value is unique, that is to say in which this momentary value occurs only once. The time resolution that can be achieved is determined by the accuracy of sampling. By virtue of this clock which counts at a low frequency, the time span in which detection events can be temporally assigned can be increased by the amount of possible clock values.

Another embodiment of the detector according to the invention has a number of detector channels, and each detector channel has an associated trigger and an associated sampler. By using a number of detector channels, detection events can be recorded simultaneously at different locations. A comparison of the respective time values is then possible by virtue of the precise time assignment. This is advantageous for example in TOF PET, since then two detection events have to be assigned to one time window and the individual events have to be recorded in each case with a high precision (for instance with an accuracy of 0.1 ns).

A further advantageous embodiment of the invention is given when there is a second time signal source, from the time signal of which a second momentary value can be sampled. If there are different time signal profiles, then a momentary value tuple is provided (momentary value tuple: that is to say in this case the combination of the two measured momentary values), which can be used for the further calculation of a time value. In the case of two phase-shifted sinusoidal signals of the same frequency, the result is a uniqueness interval of the momentary value tuple which corresponds to the period of the sinusoidal time signals. If the phase shift leads to orthogonal signals (that is to say if one signal is at the zero crossing whereas the other signal is at the maximum or minimum), then the time determination is nevertheless advantageously possible since one signal is still in a state with an incline which differs considerably from zero whereas the other signal is in a state with an incline which differs only slightly from zero or is in a state with zero incline. Therefore this is advantageous since the accuracy of the time determination is then not limited by the accuracy of the sampling in the low-incline zones of one of the time signals.

In an embodiment with two time signals, the second time signal source may also be coupled to the first time signal source. This then allows a design with a central time signal source, which for instance supplies various detector channels, and with a further, locally arranged time source which generates the second time signal as a function of the first time signal.

A further advantageous embodiment is given when a time calculation unit is provided which calculates a time value from the sampled momentary value of the time signal. The time values of the individual detection events may then be compared directly with one another and/or used for further calculation steps. This is particularly advantageous when a comparison of the time values over a time interval that is very large compared to the time resolution is to be carried out, since then the momentary values of the analog time signal can be combined for example with the clock values of a digital clock in order to calculate a time value.

In an embodiment with only one central time calculation unit or with few time calculation units it is advantageous to arrange a multiplexer between the sampler and the time calculation unit. The multiplexer may then forward for instance the momentary values coming from the samplers of other detector channels to the time calculation unit in an ordered manner. However, the multiplexer may also forward the momentary values coming from the various samplers of a single detector channel to the time calculation unit in a serial manner. The corresponding calculation units then do not need to be arranged in parallel in the time calculation unit.

The invention also relates to an imaging device in which use is made of a detector of the type described above. This may be a PET or TOF PET scanner or another nuclear medical device. Furthermore, medical imaging devices which operate by means of X-ray radiation may also advantageously be fitted with such a detector. Such devices may also be used to examine animals, plants or non-living things.

The invention furthermore relates to a method for the temporally resolved recording of detection events.

BRIEF DESCRIPTION OF THE DRAWINGS

The invention will be further described with reference to examples of embodiments shown in the drawings to which, however, the invention is not restricted.

DETAILED DESCRIPTION

Figure 1:
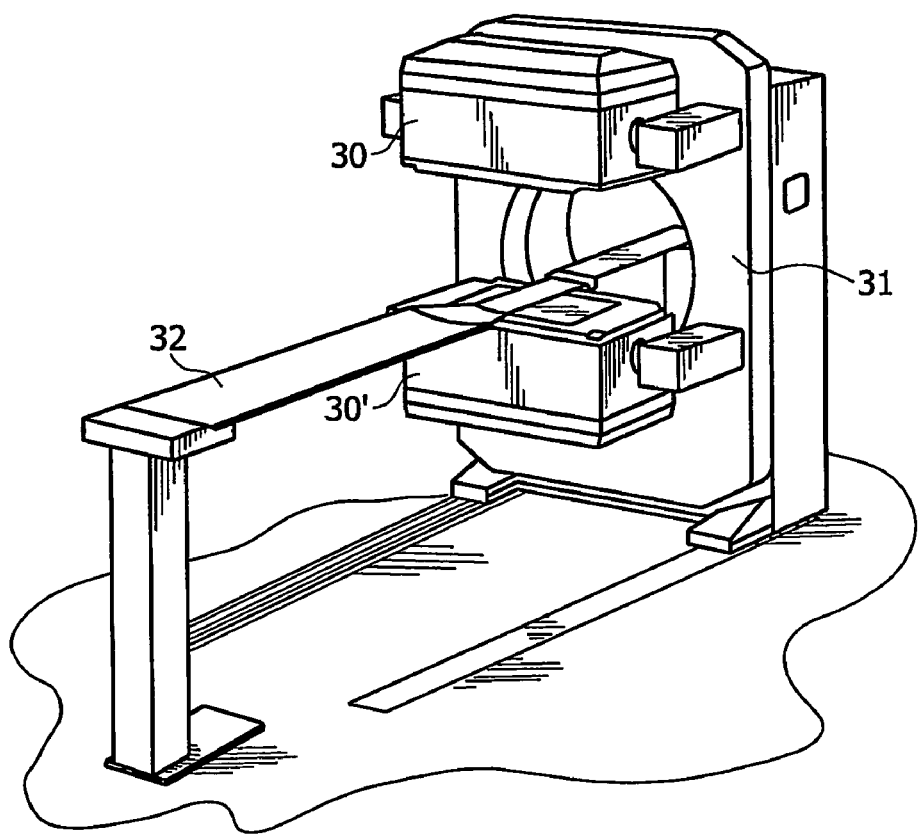
FIG. 1 shows an embodiment of a medical imaging device as used in nuclear medicine.

FIG. 1 shows one possible embodiment of an imaging device used for medical purposes, which in this embodiment has two detectors 30, 30' that are mounted on a frame structure 31. By means of a patient table 32, any patient volume that it is to be examined can be placed between the two detectors. For this purpose, either the patient table 32 is displaceable or the frame structure 31 is designed such that it can be moved. Other embodiments have only one detector 30 which is closed in the manner of a ring, or else there are three detectors which may be arranged around the volume that is to be examined. Instead of a continuous frame structure 31, the detectors may also be mounted individually by means of arms, for example on the ceiling or on the floor. In the embodiment shown, the frame structure 31 is designed to be rotatable such that tomographic data (for example PET data for reconstructing a positron emitter distribution) can be recorded.

Figure 2:
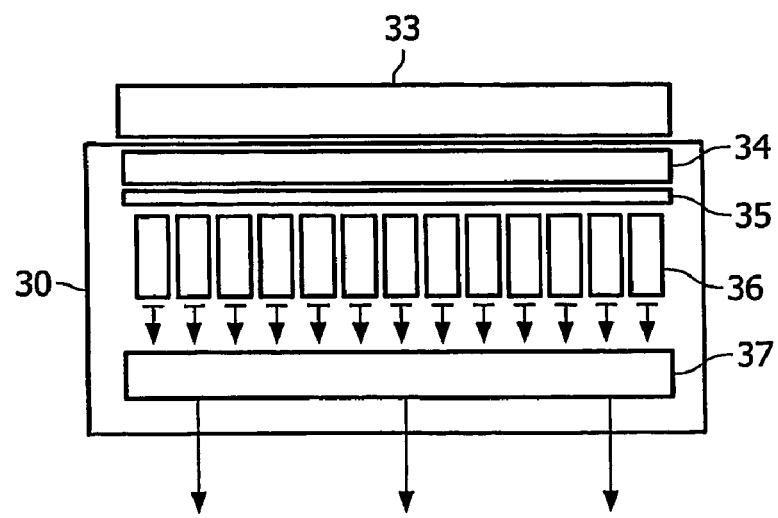
FIG. 2 shows an embodiment of a detector for detecting gamma quanta.

FIG. 2 shows one embodiment of a detector 30 as used in nuclear medicine to detect gamma quanta. In front of the detector 30 or possibly integrated therein there is often a collimator 33 which intercepts quanta from undesired directions for instance by virtue of lead walls. In other embodiments such a collimator is not required, for instance in a PET detector in which the emission direction can be determined by coincident detection of two quanta irradiated in opposite directions. The detector typically has a scintillator 34. A scintillator converts incoming quanta into light. The scintillator may for example be crystalline, consist of pressed or sputtered powder or be ceramic. In the embodiment shown, there is a light coupling 35, acting as diffuser, between scintillator 34 and the photomultipliers 36 arranged thereafter. A photomultiplier converts the incoming light into an electrical signal. Connected downstream of the photomultipliers 36 are processing electronics 37 which determine parameters such as the detection point on the detector, the detected energy and the detection time. Such detectors may have a one-dimensional or two-dimensional arrangement of photomultipliers. In another embodiment, photodiodes are arranged below the scintillator 34, which photodiodes likewise convert the incoming light into an electrical signal. Yet another embodiment of a detector consists of a directly converting material which is arranged between two electrodes, where the directly converting material converts incoming quanta into charge carriers and the electric field applied between the electrodes then generates an electrical signal. A common feature of these embodiments is a one-stage or multistage converter device which converts detection events (that is to say quanta arriving at the detector which interact with the converter device) into electrical signals. Instead of what has been shown in the embodiment, the detector may also be curved, for instance such that the detector itself is a ring or may be composed of a number of detectors to form a ring. A two-dimensional curving, for instance to form a spherical arrangement, is also conceivable.

Figure 3:
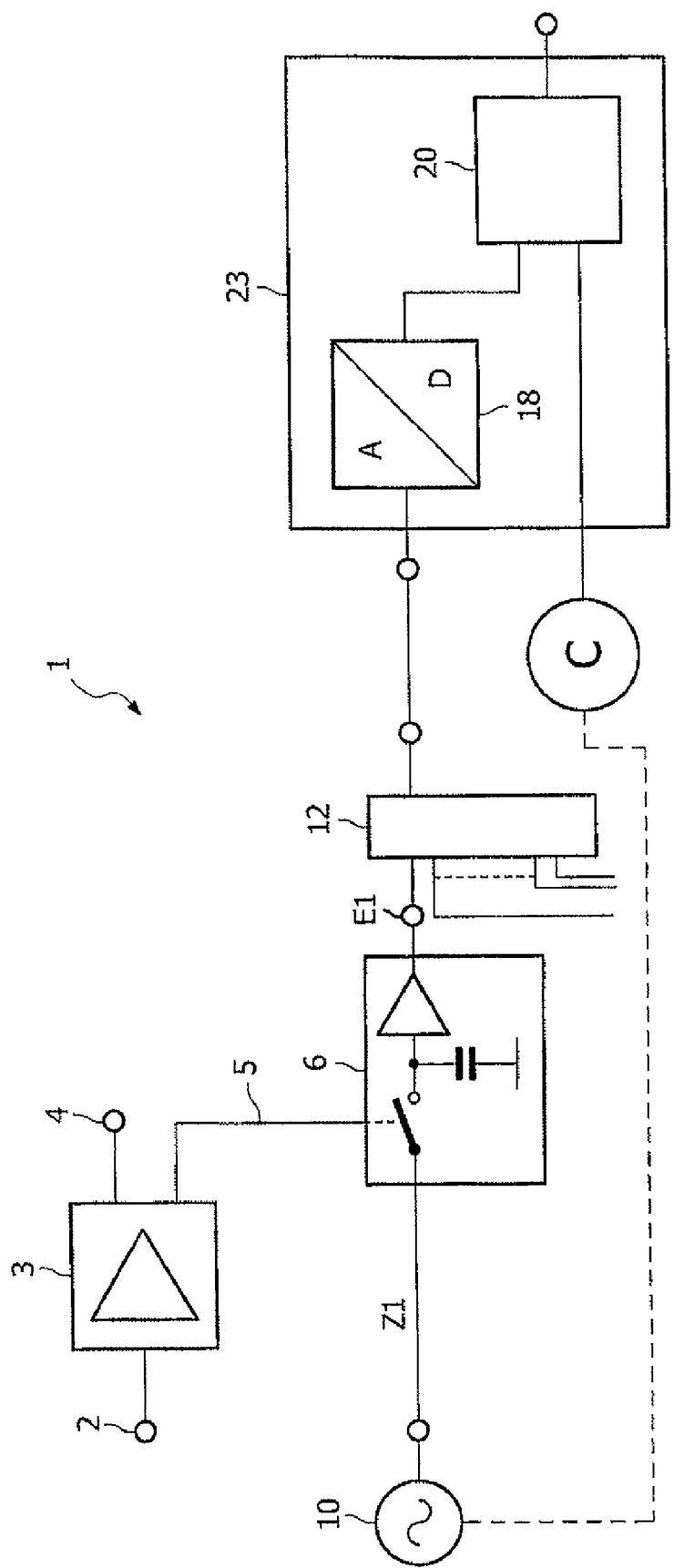
FIG. 3 shows evaluation electronics with multiplexer and time calculation unit, which uses one time signal.

FIG. 3 shows evaluation electronics 1 according to the invention in an embodiment with one analog time signal. The analog time signal Z1 (c.f. also FIG. 5 and FIG. 8) is generated by a time signal source 10. In a case with a number of detector channels, the time signal source 10 is advantageously to be used as central time signal source, which supplies a number of detector channels. Via the input 2, the evaluation electronics receive the electrical signal, which is generated when a detection event occurs, from the converter device. Such an electrical signal typically has a stretched profile which reflects parameters such as the speed of the scintillator, the applied voltage between the electrodes of a direct converter, the thickness of the conversion material, etc. The electrical signal typically rises first of all to a maximum in order then to decrease again at a slower rate than it rose. An integration amplifier 3 has an output 4 which provides a signal that is proportional to the integrated electrical signal and proportional to the overall energy of the detection event. Such a signal is important when for instance scattered quanta are to be distinguished from the unscattered quanta with 511 keV by determining their lower overall energy. The integration amplifier 3 has another output via which a trigger signal 5 is forwarded. This trigger signal 5 is generated for example when the electrical signal reaches a predefined intensity or when the integrated signal exceeds a predefined threshold value. In this case, use may be made of different implementations, for instance a CFD (Constant Fraction Discriminator), to correct for example an amplitude-dependency of that of the trigger. The trigger signal 5 triggers a sample & hold circuit 6 which measures the momentary value E1 (c.f. also FIG. 5 and FIG. 8) of the analog time signal and makes it available at its output. A rapid sample & hold circuit suitable for time resolutions of around 0.1 ns is known to the person skilled in the art. A multiplexer 12 may be connected downstream of the sample & hold circuit 6. This is advantageous when the momentary time values E1 from various sample & hold circuits 6 are to be fed to a destination (e.g. a time calculation unit 23). Since the momentary values E1 from the sample & hold circuits 6 do not arrive at defined times, the multiplexer may for example have a memory which is regularly read. In order to make it possible to directly compare the momentary value E1 of the analog time signal Z1 with other momentary values of other detection events, the momentary value E1 is converted into a time value in a time calculation unit 23. In the embodiment shown, the momentary value E1 in the time calculation unit 23 is fed to an analog/digital converter (ADC) 18. The ADC 18 digitizes the analog-transmitted momentary value E1. The bit depth of the ADC 18 (for instance 8 bit or 12 bit) and speed are adapted to the desired temporal resolution accuracy and the expected detection rate (detection events per unit time). It should be mentioned in this respect that in the embodiment shown here with only one analog time signal, the accuracy is limited by the incline of the time signal Z1. If the analog time signal is sinusoidal, for instance, then it has in the extrema an incline which is very small. In this case, therefore, high requirements are placed on the ADC 18 if the temporal resolution is to be small compared to the period duration of the sinusoidal analog time signal. After the ADC 18, the digitized momentary value is then converted into a time value by means of a look-up table 20. In this case it is assumed that the profile of the analog time signal is known. The known profile of the analog time signal is stored in the look-up table as pairs of values of relative time values and amplitude values. In this embodiment, the digitized momentary value is assigned the relative time value whose tabled amplitude value comes closest to the digitized momentary value, or else an interpolation can be carried out in order to determine the relative time value from the tabled relative time values and amplitude values. The relative times within a uniqueness interval may then be compared directly with one another or used to calculate further data. As an alternative to a look-up table, the arcus sine or arcus cosine of the momentary value may also be calculated directly in a corresponding processing unit.

In order to determine absolute time values so as to make it possible for the time values determined by the time calculation unit 23 to be compared over large time intervals, in the embodiment shown a digital clock C is connected to the time calculation unit 23. This digital clock C, which may be coupled to the time signal source, counts for example the individual uniqueness intervals. The analog time signal may thus be a ramp signal which is always brought back to the start value after it has reached the maximum value. The digital clock then counts the ramps that have already passed. The digital clock C is accordingly a clock which counts at a low frequency. If the duration of a ramp is known (duration I), the time calculation unit 23 can determine an absolute time value $T=M+A*I$ from the digitized momentary value (time value M) of the ramp and the digital value for the number of ramps that have passed (number value A). Instead of a periodic ramp signal, a triangular signal may also advantageously be used. In triangular signals, the high frequency fractions are suppressed to a greater extent than in a periodic ramp signal (sawtooth), as can be seen from Fourier development of the signals. In the case of a triangular signal or a sinusoidal signal, the clock counts the time in units of half a period (in each case from one extremum to the next extremum).

Figure 4:
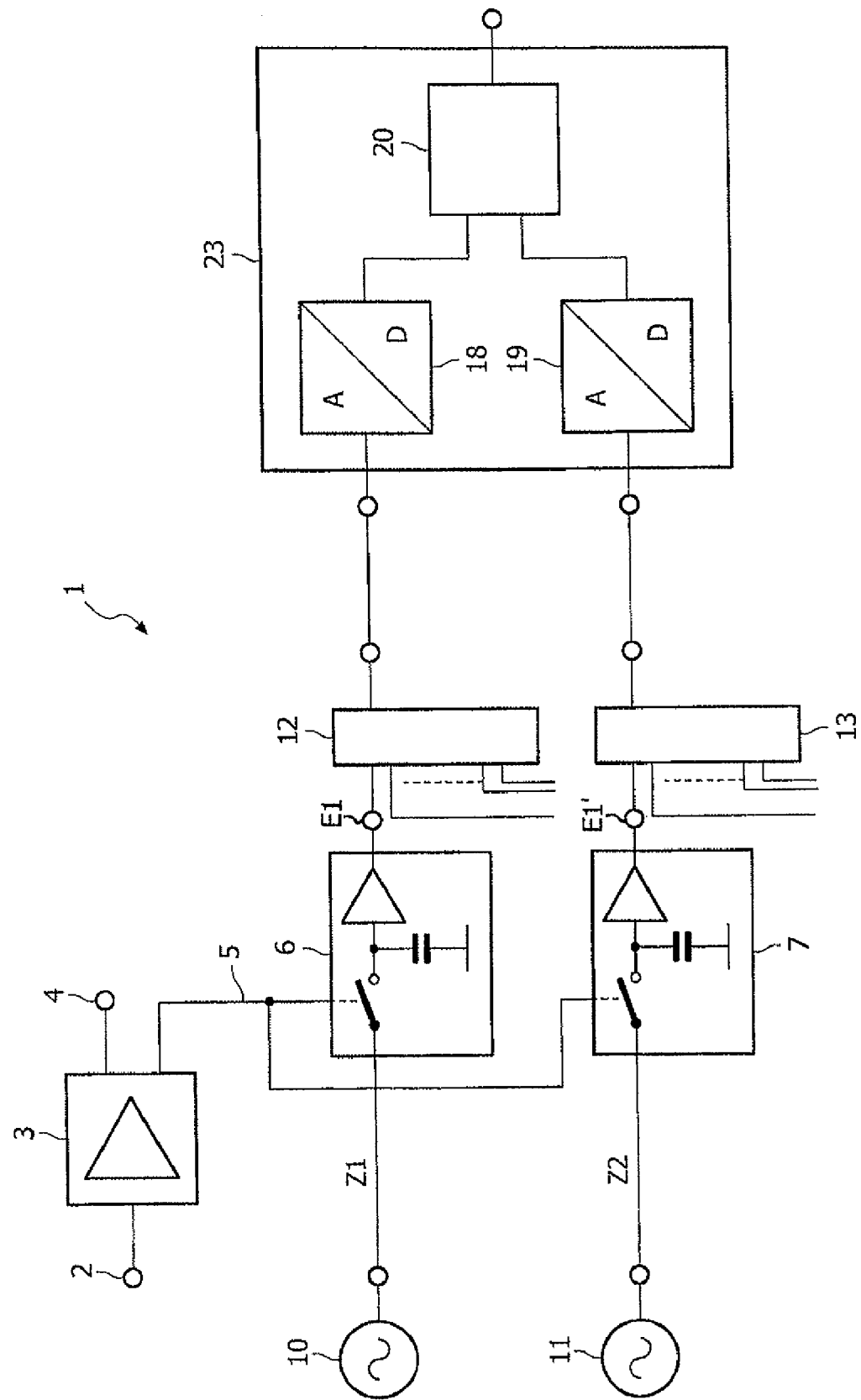
FIG. 4 shows evaluation electronics with multiplexers and time calculation unit, which uses two time signals.

FIG. 4 shows an embodiment of the evaluation electronics 1 with two time signal sources 10, 11. The time signal sources respectively supply the analog time signal Z1 and the analog time signal Z2. By virtue of the trigger signal 5, two sample & hold circuits 6 and 7 are then triggered, which respectively determine the momentary value E1 of the analog time signal Z1 and the momentary value E1' of the analog time signal Z2. The momentary values are then fed to the time calculation unit 23. Although the clock C is not shown here, it is nevertheless to be understood that it may also be used in this or any other embodiment to obtain a large uniqueness range of the time determination.

Figure 5:
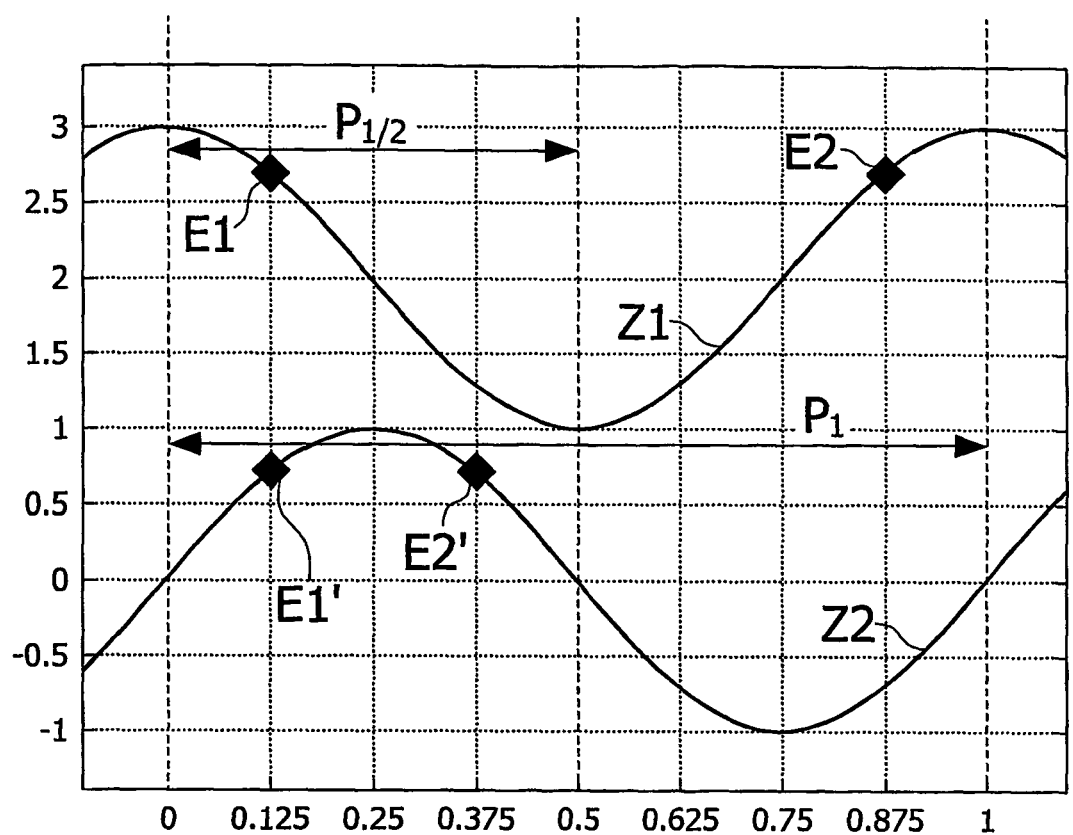
FIG. 5 shows the temporal profile of two time signal of the same frequency which are orthogonal to one another, with an example shown to illustrate the uniqueness of a two-value tuple.

FIG. 5 shows a time signal profile for sinusoidal time signals Z1 and Z2. E1 denotes the momentary value determined by sampling the analog time signal Z1 at the time value t=0.125 and said momentary value is shown as a solid rhombus in the time signal profile. E2 denotes a momentary value which would give the same value E2=E1 at the sampling time t=0.875. It is clear that in an embodiment according to FIG. 3 with only one sinusoidal analog time signal Z1, the uniqueness interval $P_{1/2}$ of the momentary value is half a period. The temporal resolution is obtained as a function of the bit depth of the ADC 18 and the selected frequency of the sinusoidal analog time signal. As already mentioned, the temporal resolution in this embodiment is limited by the incline of the sinusoidal signal in the extrema. However, in the case of an 8 bit ADC, use may nevertheless be made of a period duration of the analog time signal which is 10 times longer than the desired temporal resolution, so that this embodiment achieves the set object in an efficient and cost-effective manner. Since the assignment between momentary value and time value is mirrored in two successive half-periods, in the embodiment with a digital clock C use may be made of two look-up tables which are switched between depending on whether the counting status of the clock is even or odd, or else the mirroring can be taken into account in the time value calculation itself. In this embodiment, in the time calculation unit 23 account may also be taken of the fact that in the case of a momentary value E1 which lies close to a maximum the uncertainty in the sampling (so-called noise) may lead to ambiguity in the time calculation and therefore more importance is given to the momentary value E1' which then lies in a region with a greater incline.

FIG. 5 also shows the time signal profile of a second analog time signal Z2 which is orthogonal (that is to say has been phase-shifted by 90 degrees) with respect to the first analog time signal Z1 and has the same frequency as Z1. At the sampling time t=0.125, the momentary value E1' is measured in the analog time signal Z2. This is also repeated at a sampling time t=0.375. It can therefore be seen that the uniqueness interval is usually a period $P_1$ when using two sinusoidal, phase-shifted time signals of the same frequency. If the two analog time signals are orthogonal to one another, as shown in FIG. 5, then at a maximum or minimum of one analog time signal a zero crossing of the other analog time signal is additionally to be found. Thus the two time signals are never in a state with a small incline at the same time. The time determination may in this embodiment be made to be even more precise. When using an 8 bit ADC, a period duration of the analog time signal may be used which is 100 times greater than the desired temporal resolution. The frequency that is to be transmitted is thus once again reduced by an order of magnitude compared to the embodiment with a single analog time signal.

Figure 6:
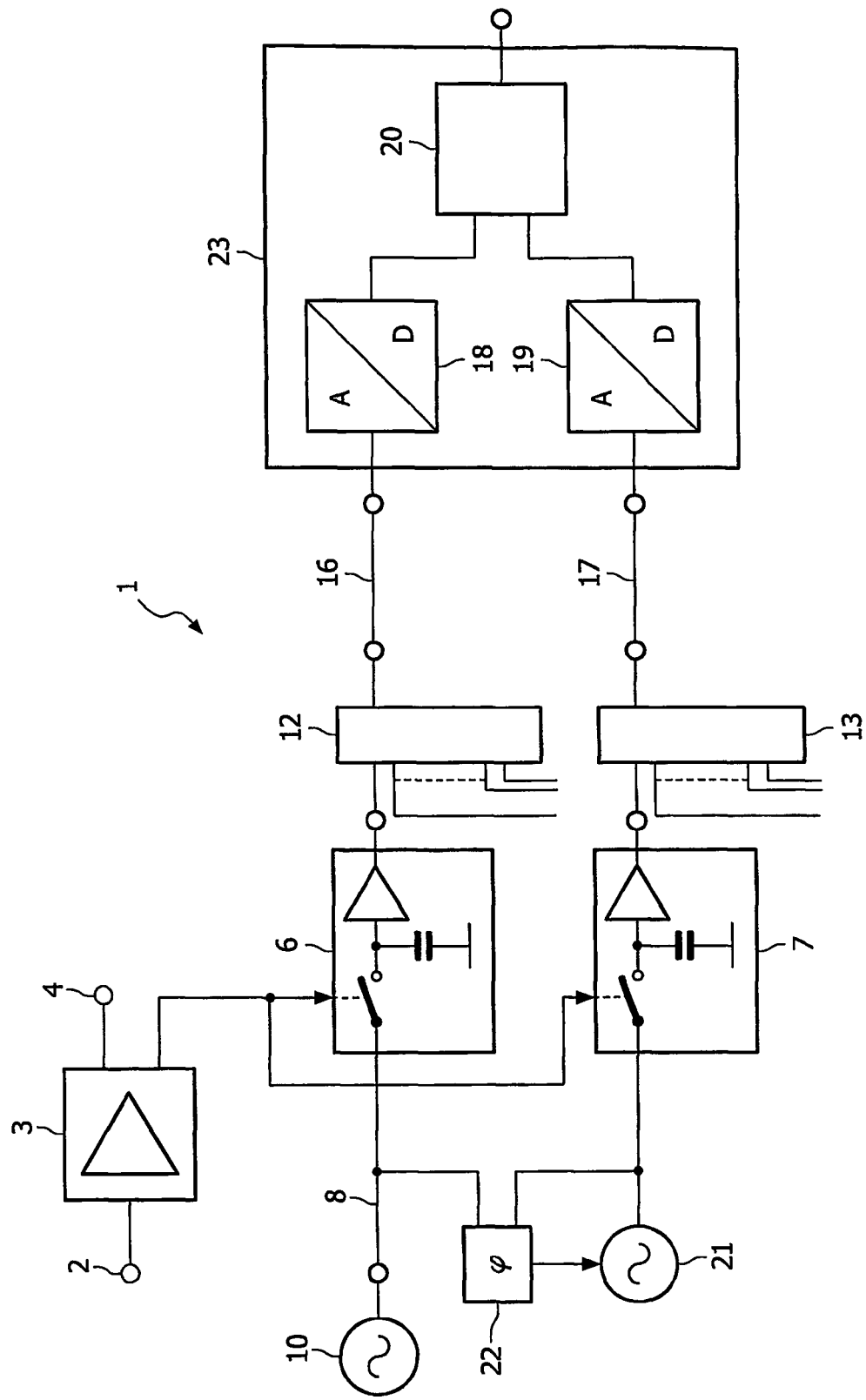
FIG. 6 shows evaluation electronics with multiplexers and time calculation unit, which uses two time signals, one signal being generated by means of coupling to the other time signal.

FIG. 6 shows an embodiment of the evaluation electronics 1 which corresponds to the embodiment of FIG. 4 but in which the second time signal source 21 is coupled to the first time signal source 10. In the embodiment shown, the coupling takes place via a phase-locked loop 22 and the time signal sources 10, 21 are both oscillators which generate sinusoidal time signals Z1 and Z2. Instead of sinusoidal time signals, use may also be made for example of triangular signals and sawtooth signals. The phase-locked loop 22 in this case ensures that the oscillator 21 generates an analog time signal that corresponds to the analog time signal Z1 of the first time signal source 10. In one preferred embodiment, the phase-locked loop 22 is set such that the analog time signals Z1 and Z2 of the first time signal source 10 and of the oscillator 21 are orthogonal. Such an embodiment has the advantage that the time signal source 10 can be used as central time signal source, which supplies all or some of the detector channels with the analog time signal Z1. The oscillator 21 may by contrast be local to the detector channel. There is then no need for the second time signal to be fed over large distances from central second time signal source 11 to the various detector channels.

Figure 7:
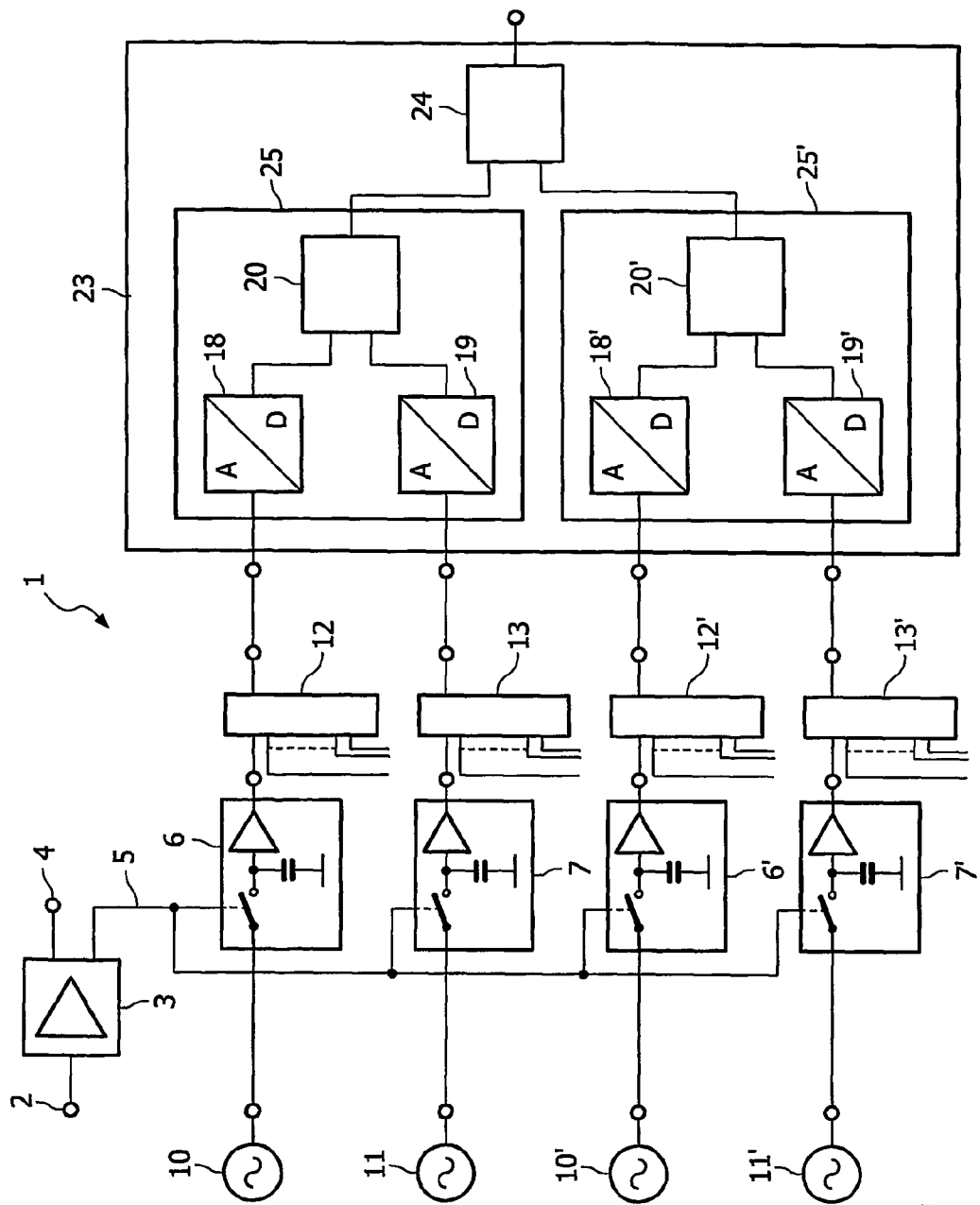
FIG. 7 shows evaluation electronics with associated multiplexers and time calculation unit, which uses four time signals.

FIG. 7 shows another embodiment of evaluation electronics 1 according to the invention. There are four time signal sources 10, 11, 10' and 11', which feed the four analog time signals Z1, Z2, Z3 and Z4 to the sample & hold circuits 6, 7, 6' and 7'. When the trigger 3 generates a trigger signal 5 on account of a detection event, the momentary values of the four analog time signals Z1, Z2, Z3 and Z4 are sampled and forwarded to a time calculation unit 23, where appropriate using multiplexers 12, 13, 12' and 13'. The embodiment of the time calculation unit 23 shown here has two time calculation circuits 25 and 25' which each correspond to the time calculation unit of FIG. 4. Each time calculation circuit 25, 25' has two ADCs 18, 18' and one look-up table 20, 20'. In one preferred embodiment, the analog time signals Z1 and Z2 are sinusoidal and orthogonal and have the frequency $f_1$; the analog time signals Z3 and Z4 are likewise sinusoidal and orthogonal but have the frequency $f_2$. If the frequencies have a ratio of $f_1/f_2=m/n$, where m and n are integers, then the uniqueness interval of the momentary values of the time signals sampled at a point in time expands to m periods of the frequency $f_1$ and n periods of the frequency $f_2$. This is shown by means of FIG. 8. The intermediate values which have been calculated for the momentary values of each time signal pair Z1, Z2 and Z3, Z4 in the time calculation circuits 25, 25' are fed to a further look-up table 24 which determines a single time value from the two intermediate values, said single time value indicating the time in the expanded uniqueness interval. In this case it is to be understood that in this embodiment for example the time signal sources 11 and 11' may be realized as local oscillators, as has been shown in FIG. 6 for a pair of time signals. It is also possible to use three time signal sources 10, 11, 10' which generate for instance a pair of sinusoidal time signals and a ramp time signal.

Figure 8:
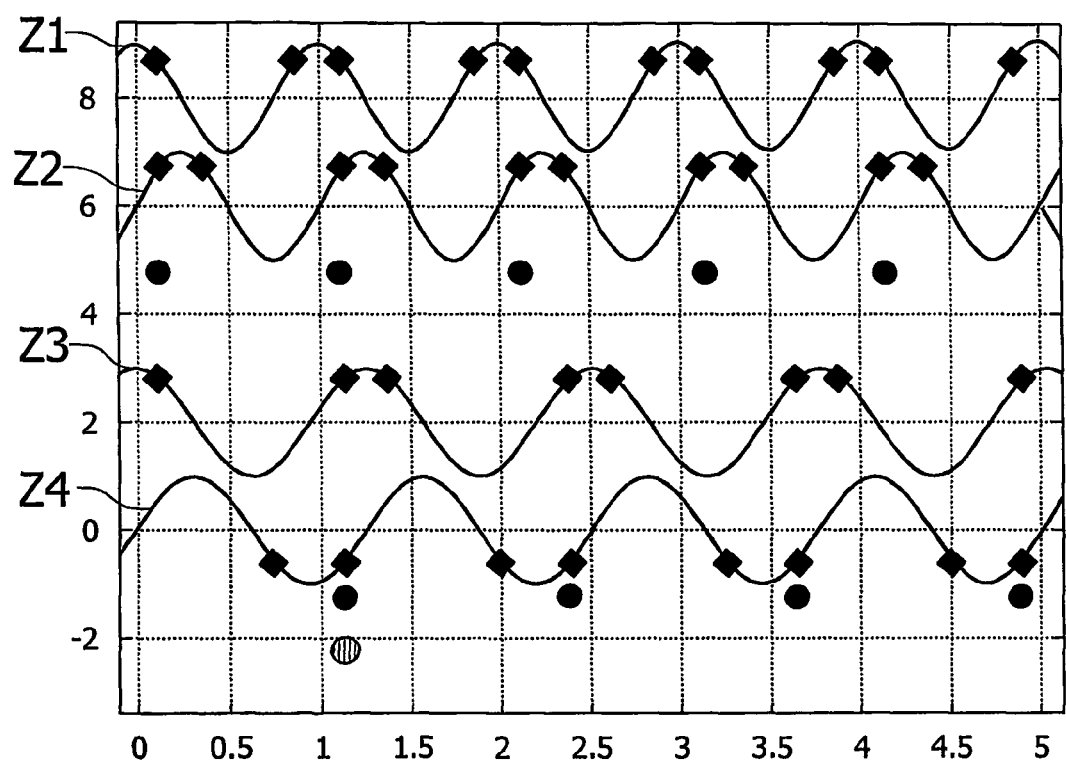
FIG. 8 shows the temporal profile of two pairs of time signals of different frequency which are orthogonal to one another, with an example shown to illustrate the uniqueness of a four-value tuple.

FIG. 8 shows an example in respect of four analog time signals Z1, Z2, Z3, Z4, the time signals Z1 and Z2 having a frequency ratio with respect to the time signals Z3 and Z4 of 4 to 5. The momentary values of the four time signals sampled at a time t (indicated by a dotted line) are shown by rhombuses in the time signal profiles. The corresponding momentary values for the respective time signals at times other than t are plotted as solid rhombuses. For the respective pairs of time signals, the coinciding two-value tuples of momentary values are shown by a solid circle in each case below the two time signal profiles. As already shown in FIG. 5, the two-value tuples of the sinusoidal, orthogonal time signals are in each case unique for a period of the time signal. For the four-value tuple of the momentary values of all four time signals there is only coincidence in the time interval shown, this being indicated by a vertically striped circle. The uniqueness interval increases with this choice of time signals by five times the period length of the time signals Z1 and Z2 or by four times the period length of the time signals Z3 and Z4.

The invention claimed is:

1. A detector for temporally resolved recording of detection events, comprising:
   a converter device, which in the operating state supplies an electrical signal when a detection event occurs;
   evaluation electronics having:
      at least one trigger that is coupled to the converter device and is designed to supply a trigger that is temporally assigned to the electrical signal,
      at least one time signal source that supplies a first analog time signal,
      at least a first sampler that is coupled to the trigger and is designed to provide a first momentary value of the first analog time signal, said first momentary value being temporally assigned to the trigger signal; and
      at least one clock which is provided to measure the time in units of a uniqueness interval of the first analog time signal.

2. A detector as claimed in claim 1, wherein the first analog time signal has a period.

3. A detector as claimed in claim 1, wherein the detector is divided into at least two detector channels and each detector channel is assigned to in each case at least one of the triggers and at least one of the samplers.

4. A detector as claimed in claim 1, wherein the evaluation electronics have a second time signal source that supplies a second analog time signal and there is a second sampler which is designed to provide a second momentary value of the second analog time signal, said second momentary value being temporally assigned to the trigger signal.

5. The detector as claimed in claim 4 wherein the second analog time signal is phase shifted from the first analog time signal.

6. The detector as claimed in claim 5 wherein the second analog time signal is orthogonal to the first analog time signal.

7. A detector as claimed in claim 1, wherein the evaluation electronics have a time calculation unit which is coupled to the first sampler, the time calculation unit being designed to calculate a time value accurate to 0.1 ns or less which is assigned to the first momentary value.

8. A detector as claimed in claim 7, wherein at least one multiplexer is arranged between the sampler and the time calculation unit.

9. An imaging device comprising a detector as claimed in claim 1.

10. A detector for the temporally resolved recording of detection events, comprising
   a converter device, which in the operating state supplies an electrical signal when a detection event occurs, and evaluation electronics including:
      at least one trigger that receives the electrical signal from the converter device and supplies a trigger signal that is temporally assigned to the electrical signal,
      a first analog signal source that supplies a first analog time signal,
      a second analog signal source that is coupled to the first analog signal source and supplies a second analog time signal,
      first and second samplers that are coupled to the trigger and provide first and second momentary values of the first and second analog time signals, said first and second momentary values being temporally assigned to the trigger signal.

11. The detector as set forth in claim 10, wherein the first and second analog time signal sources are coupled by a phase locked coupling loop.

12. A method for the temporally resolved recording of detection events, comprising the steps
   conversion of a detection event into an electrical signal,
   generation of a trigger signal that is temporally assigned to the electrical signal,
   sampling of at least a first analog time signal in temporal association with the trigger signal,
   provision of a first momentary value of the first analog time signal, and,
   assigning the momentary value an absolute time value by consulting a clock that measures time in units of a uniqueness interval of the analog time signal.

13. The method of claim 12 further comprising sampling a second analog time signal in temporal association with the trigger signal and providing a second momentary value of the second analog time signal.

14. The method of claim 13, wherein the first analog time signal and the second analog time signal are phase shifted.

15. The method of claim 14, wherein the first analog time signal is orthogonal to the second analog time signal.

16. The method of claim 12 wherein the absolute time value has a resolution of 0.1 ns or better.

17. An electronics evaluator for an imaging system comprising:
   an input for at least one electrical trigger signal;
   at least one time signal source that supplies a first oscillating analog time signal; and
   a means for providing a first momentary value of the first analog time signal and temporally assigning the first momentary value the at least one electrical trigger signal; and
   a clock for translating the first momentary value into an absolute time value, wherein the clock measures the time in units of a uniqueness interval of the first analog time signal.

18. The electronics evaluator of claim 17 further comprising a time calculation unit which is coupled to the means for providing a first momentary value, the time calculation unit providing a time value associated with the first momentary value, the time value having a temporal resolution of 0.1 ns or less.

19. The electronics evaluator of claim 17 further comprising a second time signal source that supplies a second analog time signal and a means for providing a second momentary value of the second analog time signal and temporally assigning the second momentary value to the at least one trigger value.

20. The electronics evaluator of claim 19 wherein the first analog time signal and the second analog time signal are phase shifted.

21. A detector for the temporally resolved recording of detection events, comprising:
   a converter device, which in the operating state supplies an electrical signal when a detection event occurs;
   a time calculation unit including:
      first and second time calculation circuits, each time calculation circuit including two analog to digital converters, the first and second time calculation circuits each determining an intermediate value of respective time signals fed to the time calculation circuits;
      a device that determines a single time value from the two intermediate values, the single time value indicating the time in an expanded uniqueness interval with a temporal resolution of 0.1 ns or less.

* * * * *